(12) United States Patent
Lin et al.

(10) Patent No.: US 11,283,330 B2
(45) Date of Patent: Mar. 22, 2022

(54) INTEGRATED APPARATUS OF WATER-COOLED MOTOR AND DRIVER

(71) Applicant: Delta Electronics, Inc., Taoyuan (TW)

(72) Inventors: Wu-Chen Lin, Taoyuan (TW);
Chi-Hsiang Kuo, Taoyuan (TW);
Chien-Chung Shih, Taoyuan (TW);
Chia-Hsiang Yang, Taoyuan (TW);
Yi-Yu Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/523,488

(22) Filed: Jul. 26, 2019

(65) Prior Publication Data

US 2020/0036264 A1    Jan. 30, 2020

Related U.S. Application Data

(60) Provisional application No. 62/711,041, filed on Jul. 27, 2018.

(30) Foreign Application Priority Data

Jun. 5, 2019 (CN) .......................... 201910485953.4

(51) Int. Cl.
*H02K 9/19* (2006.01)
*H02K 5/22* (2006.01)
*H02K 1/20* (2006.01)

(52) U.S. Cl.
CPC ............... *H02K 9/19* (2013.01); *H02K 1/20* (2013.01); *H02K 5/225* (2013.01)

(58) Field of Classification Search
CPC .. H02K 1/20; H02K 5/20; H02K 9/19; H02K 9/193; H02K 5/128; H02K 5/225
(Continued)

(56) References Cited

U.S. PATENT DOCUMENTS

2013/0049495 A1* 2/2013 Matsuo ................. G06F 16/178
310/53
2013/0241327 A1* 9/2013 Soma ..................... H02K 5/225
310/54
(Continued)

FOREIGN PATENT DOCUMENTS

CN    103312261 A    9/2013
CN    204915282 U    12/2015
(Continued)

OTHER PUBLICATIONS

TW Office Action and Search Report of corresponding TW application No. 108119400 dated Apr. 2, 2021, 8 pages.
(Continued)

*Primary Examiner* — Quyen P Leung
*Assistant Examiner* — Minki Chang
(74) *Attorney, Agent, or Firm* — Muncy, Geissler, Olds & Lowe, P.C.

(57) ABSTRACT

An integrated apparatus of water-cooled motor and driver includes a motor housing and a driver housing. The motor housing includes a motor-housing inner wall, a motor-housing outer wall, an inlet, a heat-dissipation flow channel and an outlet. The motor-housing inner wall surrounds and receives a motor assembly. The motor-housing outer wall surrounds the motor-housing inner wall, and the exterior thereof has a first connecting surface. The inlet is disposed on the motor-housing outer wall. One end of the heat-dissipation flow channel is connected to the inlet, the end contacts and is received between the motor-housing inner wall and the motor-housing outer wall. The outlet is connected to the other end of the heat-dissipation flow channel and is disposed on the motor-housing outer wall. The driver housing receives a driver assembly, and the exterior thereof
(Continued)

has a second connecting surface connected with and bonded to the first connecting surface.

11 Claims, 9 Drawing Sheets

(58) Field of Classification Search
USPC .................................. 310/52, 54, 58, 59, 64
See application file for complete search history.

(56) References Cited

U.S. PATENT DOCUMENTS

2016/0126808 A1    5/2016  Nagao et al.
2019/0043061 A1*   2/2019  Hotori .................... G06Q 30/02

FOREIGN PATENT DOCUMENTS

| CN | 105576904 A | 5/2016 |
| CN | 106787467 A | 5/2017 |
| JP | 2016-077117 A | 5/2016 |

OTHER PUBLICATIONS

CN Office Action of corresponding CN application No. 201910485953.4 dated Dec. 24, 2020, 7 pages.

* cited by examiner

INTEGRATED APPARATUS OF WATER-COOLED MOTOR AND DRIVER

CROSS REFERENCE TO RELATED APPLICATIONS

This application claims the benefit of U.S. Provisional Application No. 62/711,041, filed Jul. 27, 2018, and claims priority of China Patent Application No. 201910485953.4, filed Jun. 5, 2019, the entirety of which are incorporated by reference herein.

BACKGROUND

Technical Field

The disclosure relates to water-cooled motor and driver, and in particular to an integrated apparatus of water-cooled motor and driver.

Description of the Related Art

Electric motors have been widely adopted in a variety of tools, such as pumps, hydraulic presses, vehicles and motorcycles. Generally, an electric motor may generate enormous heat. Therefore, a cooling system is required to dissipate the heat. In addition, an electric motor is generally controlled by a driver, and massive amounts of electric power needs to be provided to the electric motor and the driver. As a result, an additional cooling system is required to dissipate the heat of the driver.

However, using two cooling systems to respectively dissipate the heat of the electric motor and the driver may increase the manufacturing cost and take up too much space. Therefore, although existing electric motors and their cooling systems may satisfy the purpose of use, many other requirements are still not met. Accordingly, an improved cooling system need to be provided.

BRIEF SUMMARY

The present disclosure provides an integrated apparatus of water-cooled motor and driver, which may have a smaller volume and a lower manufacturing cost. In addition, the heat-dissipation efficiency and power density may be enhanced.

The present disclosure provides an integrated apparatus of water-cooled motor and driver, which includes a motor housing and a driver housing. The motor housing includes a motor-housing inner wall, a motor-housing outer wall, an inlet, a heat-dissipation flow channel and an outlet. The motor-housing inner wall surrounds and receives a motor assembly. The motor-housing outer wall surrounds the motor-housing inner wall, and the exterior thereof has a first connecting surface. The inlet is disposed on the motor-housing outer wall. One end of the heat-dissipation flow channel is connected to the inlet, the end contacts and is received between the motor-housing inner wall and the motor-housing outer wall. The outlet is connected to the other end of the heat-dissipation flow channel and is disposed on the motor-housing outer wall. The driver housing receives a driver assembly. The exterior of the driver housing has a second connecting surface connected and attached to the first connecting surface. The heat-dissipation flow channel further comprises a cooling section arranged corresponding to the first connecting surface.

In an embodiment, both of the first connecting surface and the second connecting surface are planar, and the cooling section of the heat-dissipation flow channel is windingly arranged corresponding to the first connecting surface.

In an embodiment, the second connecting surface is planar. The cooling section of the heat-dissipation flow channel is windingly arranged corresponding to the first connecting surface. A portion of the cooling section of the heat-dissipation flow channel overlaps with the first connecting surface.

In an embodiment, the integrated apparatus of water-cooled motor and driver further includes a seal ring that is disposed between the first connecting surface and the second connecting surface. In an embodiment, the integrated apparatus of water-cooled motor and driver further includes a thermal-conductive material that is disposed between the first connecting surface and the second connecting surface.

In an embodiment, the integrated apparatus of water-cooled motor and driver further includes a top portion. The top portion is disposed on and covers the motor-housing inner wall and the motor-housing outer wall, and the top portion surrounds and receives an electrical connector, wherein the electrical connector is electrically connected to the motor assembly and the driver assembly.

In an embodiment, a cooling liquid circulates in the heat-dissipation flow channel.

The present disclosure provides an integrated apparatus of water-cooled motor and driver, which includes a motor-housing inner wall, a motor-housing outer wall, an inlet, a heat-dissipation flow channel and an outlet. The motor-housing inner wall surrounds and receives a motor assembly. The motor-housing outer wall surrounds the motor-housing inner wall. The exterior of the motor-housing outer wall has a receiving groove for receiving a driver assembly. The inlet is disposed on the motor-housing outer wall. One end of the heat-dissipation flow channel is connected to the inlet, the end contacts and is received between the motor-housing inner wall and the motor-housing outer wall. The outlet is connected to the other end of the heat-dissipation flow channel and is disposed on the motor-housing outer wall.

The receiving groove includes a connecting surface, an annular sidewall and a cover plate. The driver assembly is attached to the connecting surface. The annular sidewall is connected to the connecting surface. The cover plate is connected to the annular sidewall, wherein the connecting surface, the annular sidewall and the cover plate collectively surround the driver assembly. The heat-dissipation flow channel further includes a cooling section arranged corresponding to the connecting surface.

In an embodiment, the integrated apparatus of water-cooled motor and driver further includes a seal ring that is disposed between the annular sidewall and the cover plate.

In an embodiment, the integrated apparatus of water-cooled motor and driver further includes a top portion. The top portion is disposed on and covers the motor-housing inner wall and the motor-housing outer wall, the top portion surrounds and receives an electrical connector. The electrical connector is electrically connected to the motor assembly and the driver assembly. In an embodiment, the top portion has an accommodating space that communicates with the receiving groove, and the electrical connector is disposed in the accommodating space.

In an embodiment, a cooling liquid circulates in the heat-dissipation flow channel.

As set forth above, the present disclosure provides an integrated apparatus of water-cooled motor and driver, in which just one cooling system can be used for dissipating the heat of the motor assembly and the driver assembly at the same time. Therefore, the integrated apparatus of water-cooled motor and driver may reduce the manufacturing cost and the volume, and enhance the heat-dissipation efficiency and power density.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the same numerals and/or words are repeated in different examples of the present specification. Those repetitions are merely for simplicity and clarity, but not represent there must be a relationship between different embodiments and settings.

Spatially relative terms, such as "upper," "lower," and the like, used herein are merely for ease of description to describe one element or feature's relationship to another element or feature as illustrated in the figures. The spatially relative terms are intended to encompass different orientations of the device in use or operation in addition to the orientation depicted in the figures. In addition, the shapes, dimensions, and thicknesses may be not drawn to scale or simplified for the purpose of clear discussion, and they are merely provided for the description.

Figure 1:
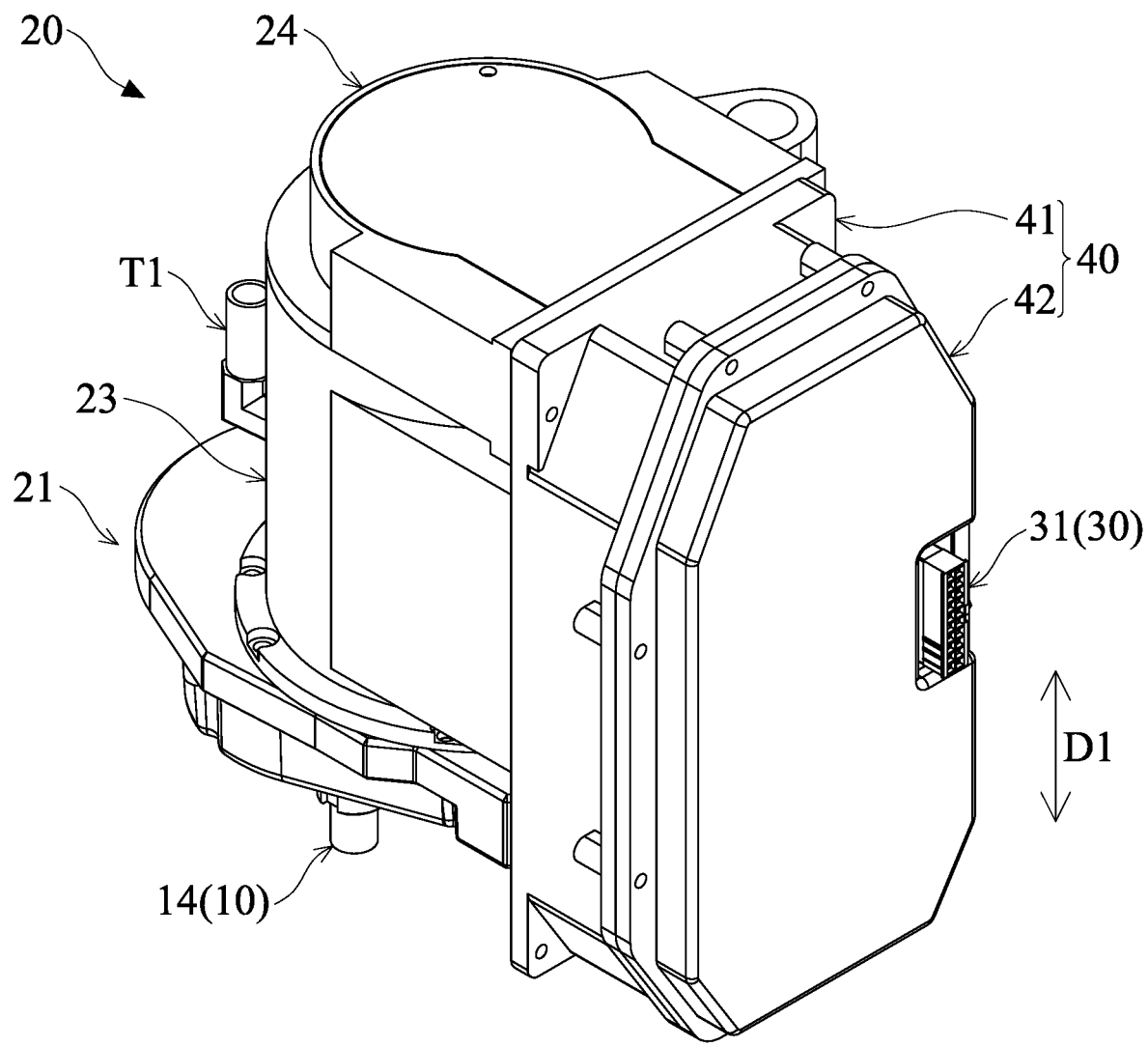
FIG. 1 is a perspective view illustrating a first embodiment of an integrated apparatus of water-cooled motor and driver in the present disclosure.
Figure 2:
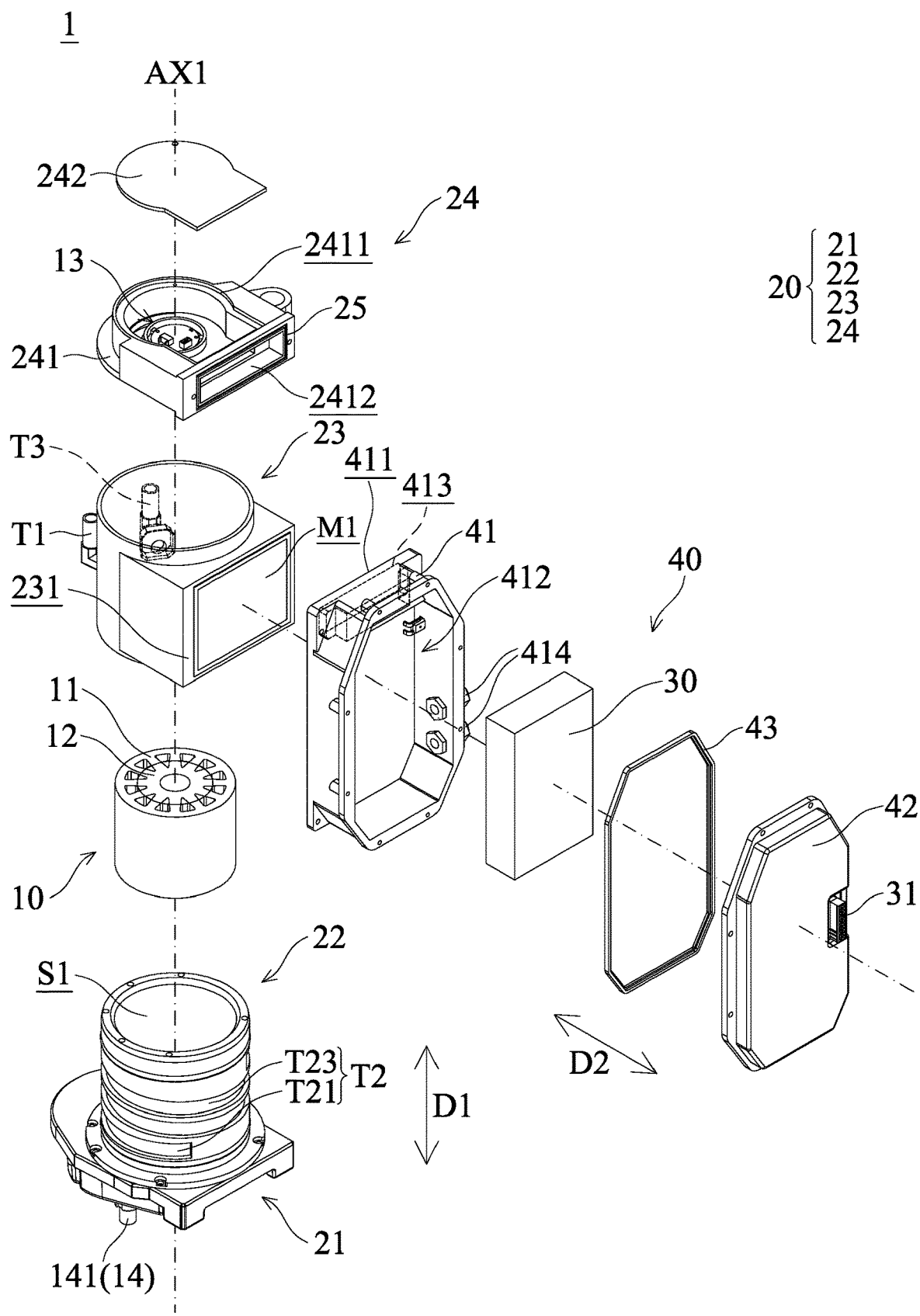
FIG. 2 is an exploded view illustrating the first embodiment of the integrated apparatus of water-cooled motor and driver in the present disclosure.

FIG. 1 is a perspective view illustrating a first embodiment of an integrated apparatus 1 of water-cooled motor and driver in the present disclosure. FIG. 2 is an exploded view illustrating the first embodiment of the integrated apparatus 1 of water-cooled motor and driver in the present disclosure. The integrated apparatus 1 of water-cooled motor and driver (i.e., water-cooled motor system) includes a motor assembly 10, a motor housing 20, a driver assembly 30 and a driver housing 40. The motor assembly 10 is disposed in the motor housing 20. In the present embodiment, the motor assembly 10 may be an electric motor.

The motor assembly 10 may include a stator 11, a rotor 12, an electrical connector 13 and a power output mechanism 14. It should be noted that an inner rotor type motor serves as an example in the present disclosure, therefore the stator 11 may be disposed to surround the rotor 12, but it is not intended to limit the present disclosure. For example, an outer rotor type motor may also be applicable for the framework of the present disclosure. The rotor 12 may rotate relative to the stator 11 about a rotating axis AX1. In the present embodiment, the stator 11 may be configured to provide a magnetic force for the rotor 12, and the magnetic force may drive the rotor 12 to rotate.

The electrical connector 13 is disposed in the motor housing 20 and may be electrically connected to the stator 11. When an electric power is provided for the stator 11 via the electrical connector 13, the stator 11 generates a magnetic force and thus drives the rotor 12 to rotate. The power output mechanism 14 may be (physically) connected to the rotor 12. When the motor assembly 10 is rotating, the rotor 12 drives the power output mechanism 14. In the present embodiment, the power output mechanism 14 may include an output shaft 141. When in rotating, the rotor 12 drives the power output mechanism 14, and the power output mechanism 14 drives the output shaft 141 to rotate. For example, the output shaft 141 may be connected to a machine tool or a transportation, and thereby provide power for operating the machine tool or the transportation. In some embodiments, the rotating speed of the output shaft 141 may be the same as or different from the rotating speed of the rotor 12.

The driver assembly 30 is disposed in the driver housing 40, and electrically connected to the electrical connector 13. The driver assembly 30 may supply power to the stator 11 of the motor assembly 10 via the electrical connector 13. In addition, the driver assembly 30 may be configured to generate at least a control signal for controlling the start, stop, rotating angle and/or speed of the motor assembly 10, but it is not limited thereto. The control signals generated by the driver assembly 30 may be transmitted to the stator 11 of the motor assembly 10 via the electrical connector 13.

In the present embodiment, the motor housing 20 includes a base 21, a motor-housing inner wall 22, a motor-housing outer wall 23 and a top portion 24. The power output mechanism 14 may be disposed in the base 21, and a portion of the output shaft 141 may pass through the base 21 and extend out of the motor housing 20. The motor-housing inner wall 22 may be disposed on the base 21. In the present embodiment, an extending direction D1 may be parallel to the rotating axis AX1. In some embodiments, the motor-housing inner wall 22 may be integrated with the base 21, and may include the same material(s) of the base 21. In some embodiments, the motor-housing inner wall 22 and the base 21 may be made of thermal-conductive material, such as metal or ceramics, but they are not limited thereto.

In the present embodiment, the motor-housing inner wall 22 may surround and receive the motor assembly 10. The motor-housing inner wall 22 may be substantially a hollow cylindrical structure, and may extend along the extending direction D1. The motor-housing inner wall 22 may define and form an accommodating space S1 therein. The rotating axis AX1 may pass through a geometric center of the accommodating space S1. The stator 11 and the rotor 12 of the motor assembly 10 may be placed in the accommodating space S1. In addition, the stator 11 may be connected and affixed to an inner side of the motor-housing inner wall 22; that is, the stator 11 may be connected and affixed to an outer edge of the accommodating space S1. Therefore, in the present embodiment, the heat generated by the motor assembly 10 may be directly transferred to the motor-housing inner wall 22, and thereby the heat generated by the motor assembly 10 may be dissipated efficiently.

The motor-housing outer wall 23 may be disposed on the base 21 and surround the motor-housing inner wall 22. In the present embodiment, the motor-housing outer wall 23 may have a first connecting surface 231, which contacts a portion of the driver housing 40. The tangential direction of the first connecting surface 231 may extend along the extending direction D1. In some embodiments, the motor-housing outer wall 23 is removably disposed on the base 21 and/or the motor-housing inner wall 22 for facilitating the assembly and/or repair of the integrated apparatus 1 of water-cooled motor and driver. The motor-housing outer wall 23 may be made of thermal-conductive material, such as metal or ceramics, but it is not limited thereto. In the present embodiment, the heat generated by the motor assembly 10 or conducted via the motor-housing inner wall 22 may be indirectly transferred to the motor-housing outer wall 23, and thereby the heat generated by the motor assembly 10 may be also dissipated.

The top portion 24 may be disposed on and cover both of the motor-housing inner wall 22 and the motor-housing outer wall 23. The top portion 24 may be substantially a hollow structure, which surrounds and receives the electrical connector 13. In some embodiments, the top portion 24 is removably disposed on the motor-housing inner wall 22 and/or the motor-housing outer wall 23 for facilitating the repair of the integrated apparatus 1 of water-cooled motor and driver. In the present embodiment, the top portion 24 may include an upper body 241 and an upper cover plate 242. The interior of the upper body 241 includes an accommodating space 2411 and a first connecting opening 2412. The electrical connector 13 may be placed in the accommodating space 2411, and the first connecting opening 2412 communicates with the accommodating space 2411. The upper cover plate 242 is removably disposed on the upper body 241 and covers the accommodating space 2411.

The driver housing 40 is disposed on and attached to the motor housing 20. The driver housing 40 may be substantially a hollow structure therein and configured to receive the driver assembly 30. The driver housing 40 may include a body portion 41, a cover plate 42 and a seal ring 43. The exterior of the body portion 41 has a second connecting surface 411. The second connecting surface 411 is connected with and bonded to the first connecting surface 231 of the motor housing 20. The second connecting surface 411 may be parallel to the first connecting surface 231. That is, the tangential direction of the second connecting surface 411 may extend along the extending direction D1. In the present embodiment, the first connecting surface 231 and the second connecting surface 411 may both be smooth planes, but they are not limited thereto. In addition, the first connecting surface 231 is in contact with at least 70% of the area of the second connecting surface 411, but it is not limited thereto.

In the present embodiment, the body portion 41 and/or the cover plate 42 may be made of thermal-conductive material, such as metal or ceramics, but they are not limited thereto. The driver assembly 30 is connected with and bonded to a corresponding position in the hollow structure of the body portion 41. As a result, the heat generated by the driver assembly 30 may be directly conducted to the body portion 41, and the heat of the body portion 41 may also be conducted to the motor-housing outer wall 23 via the second connecting surface 411 and the first connecting surface 231 indirectly.

In the present embodiment, a thermal-conductive material M1 may be disposed between the first connecting surface 231 and/or the second connecting surface 411. In some embodiments, the thermal-conductive material M1 is distributed on at least 70% of the area of the first connecting surface 231 and/or the second connecting surface 411. In other words, the first connecting surface 231 indirectly contacts the second connecting surface 411 via the thermal-conductive material M1. In some embodiments, the thermal-conductive material M1 may be omitted. At this time, the first connecting surface 231 directly contacts the second connecting surface 411, as set forth above.

In the present embodiment, the body portion 41 of the driver housing 40 may include an accommodating space 412 and a second connecting opening 413. The driver assembly 30 may be disposed in the accommodating space 412. The second connecting opening 413 is formed in and penetrates the second connecting surface 411, and may communicate with the accommodating space 412. Therefore, a cable, a wire or a signal line (not shown), which matches with the driver assembly 30 in the driver housing 40, may be connected to the electrical connector 13 in the top portion 24 through the second connecting opening 413 and the first connecting opening 2412 of the motor housing 20.

Figure 3:
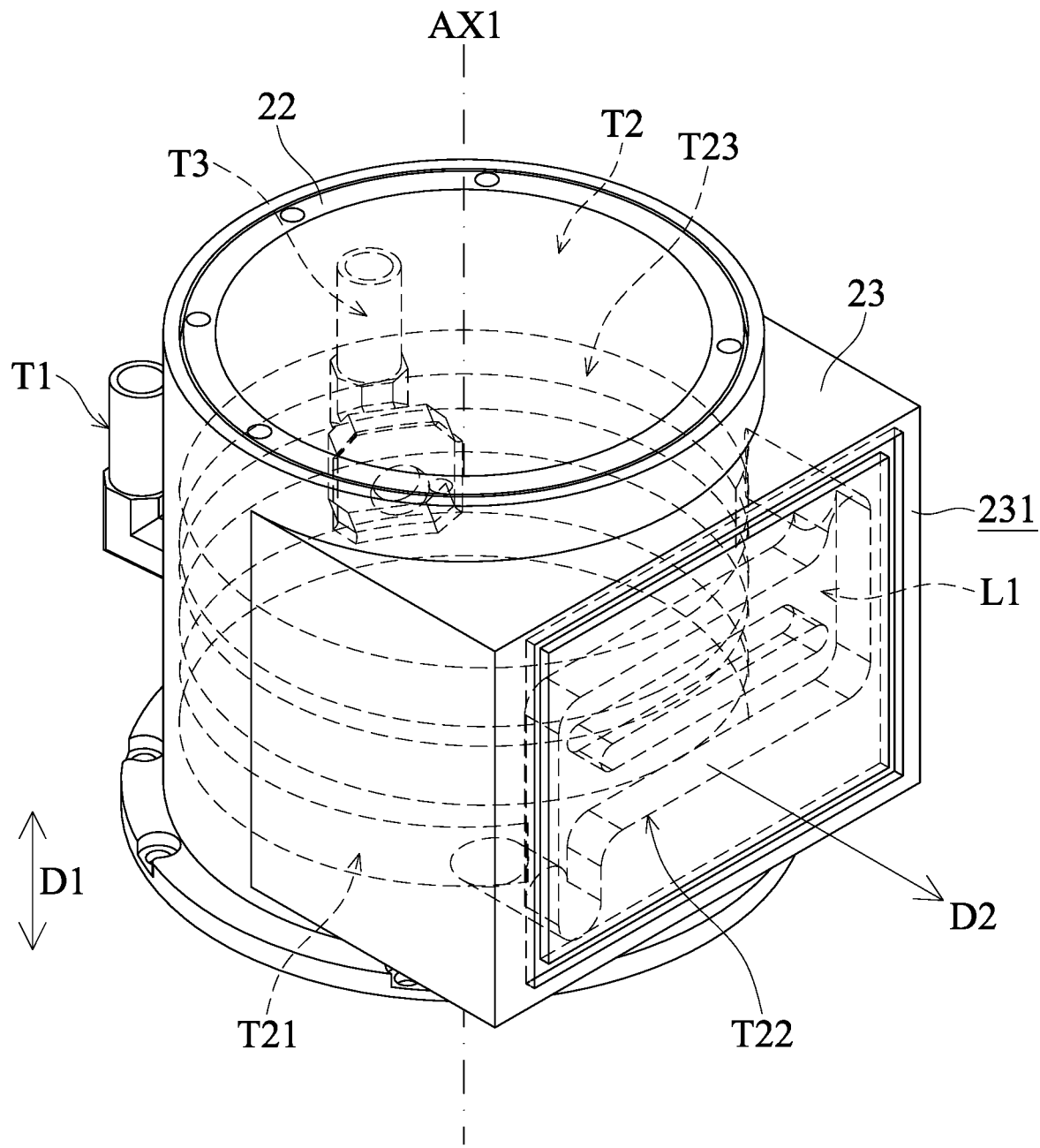
FIG. 3 is a partial perspective view illustrating a first embodiment of the motor housing in the present disclosure.
Figure 4:
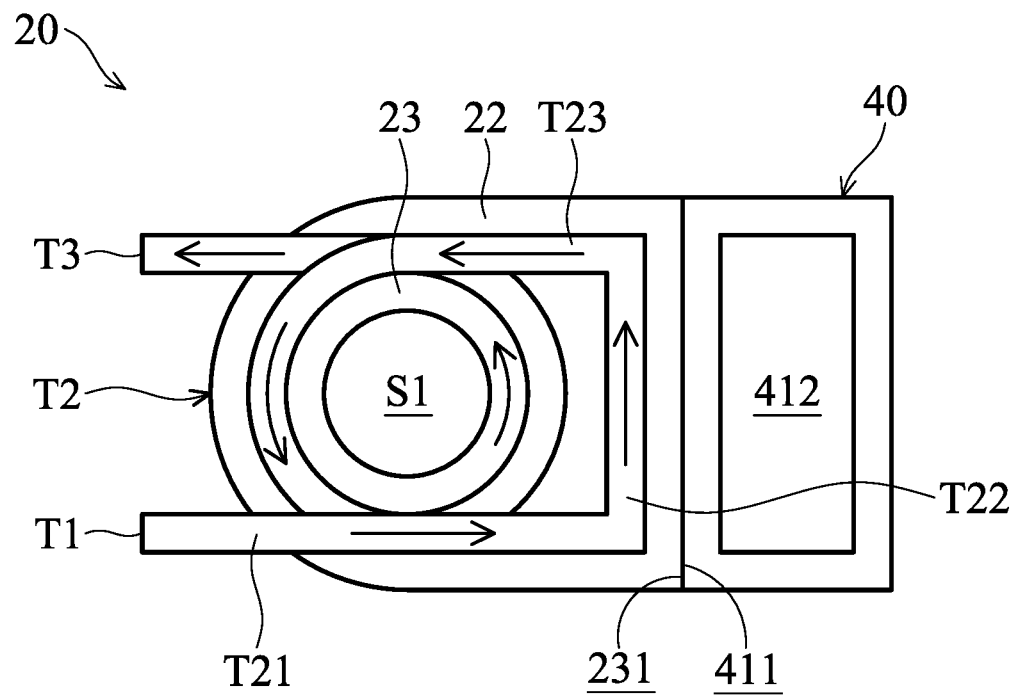
FIG. 4 is a schematic view illustrating a first embodiment of the motor housing and the driver housing in the present disclosure.

In the present embodiment, the motor housing 20 may further include a seal ring 25, which is disposed between the upper body 241 and the second connecting surface 411 of the body portion 41 of the driver housing 40. The seal ring 25 may be configured to prevent a cooling liquid L1 (as shown in FIGS. 3 and 4), such as water or any other heat-conductive liquid, from flowing into the top portion 24 via the first connecting opening 2412. Therefore, the condition of short circuit is avoided for the electrical connector 13. Furthermore, the seal ring 25 may also be configured to prevent the cooling liquid L1 from flowing into the driver housing 40 via the second connecting opening 413 of the driver housing 40, and thus avoid the condition of short circuit for the driver assembly 30.

The body portion 41 of the driver housing 40 may further include one or more wire hole 414. The wire (not shown) may be connected from a device outside the driver housing 40 to the driver assembly 30 via the wire hole 414 for supplying electric power or electric signal for the driver inside the driver assembly 30.

The cover plate 42 of the driver housing 40 is removably disposed on the body portion 41 and covers the accommodating space 412. The seal ring 43 is disposed between the body portion 41 and the cover plate 42. The seal ring 43 may be configured to prevent the cooling liquid L1 from flowing into the accommodating space 412 via somewhere between the body portion 41 and the cover plate 42, and thus avoid the condition of short circuit for the driver assembly 30.

The driver assembly 30 may include a driving electrical connector 31 that is disposed in the cover plate 42. The driving electrical connector 31 may be coupled to an external control apparatus (not shown) and receive operating signals transmitted by the control apparatus.

FIG. 3 is a partial perspective view illustrating the first embodiment of the motor housing 20 in the present disclosure. FIG. 4 is a schematic view illustrating the first embodiment of the motor housing 20 and the driver housing 40 in the present disclosure. As shown in FIGS. 2-4, the motor housing 20 further includes an inlet T1, a heat-dissipation flow channel T2 and an outlet T3. The inlet T1 communicates with and is disposed on the motor-housing outer wall 23. One end of the heat-dissipation flow channel T2 is connected to the inlet T1. The heat-dissipation flow channel T2 contacts and is received between the motor-housing inner wall 22 and the motor-housing outer wall 23. In other words, the heat-dissipation flow channel T2 may be partially formed on the motor-housing inner wall 22, or partially formed on the motor-housing outer wall 23. In some embodiments, a portion of the heat-dissipation flow channel T2 is formed on the motor-housing inner wall 22, and another portion of the heat-dissipation flow channel T2 is formed on the motor-housing outer wall 23. In the present embodiment, the heat-dissipation flow channel T2 is disposed to surround the exterior of the motor-housing inner wall 22. The outlet T3 communicates with and is disposed on the motor-housing outer wall 23, and is connected to the other end of the heat-dissipation flow channel T2.

In the present embodiment, the inlet T1 may be connected to an external water pump (not shown) via a pipe. The external water pump supplies the cooling liquid L1 through the pipe into the inlet T1. The cooling liquid L1 flows into the heat-dissipation flow channel T2 via the inlet T1 and then circulates in the heat-dissipation flow channel T2. The cooling liquid L1 in the heat-dissipation flow channel T2 may be finally discharged via the outlet T3. The outlet T3 may be connected back to the water pump via another pipe in order to allow the cooling liquid L1 to circulates completely through the whole heat-dissipation flow channel T2 to dissipate heat.

In the present embodiment, the heat-dissipation flow channel T2 has an input section T21, a cooling section T22 and a surrounding section T23. The input section T21 is connected to the inlet T1 and the cooling section T22. The input section T21 may be formed out of the motor-housing inner wall 22 and/or the motor housing 20 (such as connected to the pipe of the inlet end of the water pump). Since the motor-housing inner wall 22 may be a hollow cylindrical structure, therefore the input section T21 may be arc-shaped, but it is not limited thereto.

The cooling section T22 is arranged corresponding to the first connecting surface 231 of the motor housing 20, one end of the cooling section T22 is connected to the input section T21, and the other end of the cooling section T22 is connected to the surrounding section T23. In the present embodiment, the cooling section T22 is windingly arranged corresponding to the first connecting surface 231 of the motor housing 20. In addition, the cooling section T22 is separated or maintains an adequate distance from the first connecting surface 231. The cooling section T22 may be arranged as extending along a plane that is parallel to the first connecting surface 231. In other words, the cooling section T22 may be arranged as extending along a tangential direction D2 that is perpendicular to the first connecting surface 231. In the present embodiment, the tangential direction D2 of the first connecting surface 231 may be perpendicular to the extending direction D1. Furthermore, a cross-sectional area of the cooling section T22 that is projected on the first connecting surface 231 is greater than 50% of the area of the first connecting surface 231. The cross-sectional area is measured on the plane that is parallel to the first connecting surface 231.

In the present embodiment, since the cooling section T22 is windingly arranged and extends along the first connecting surface 231, and the cooling liquid L1 circulates through the cooling section T22, the cooling liquid L1 may further remove the heat which is generated and conducted from inside the driver housing 40 to the motor-housing outer wall 23. Therefore, the heat of the driver assembly 30 is dissipated indirectly.

One end of the surrounding section T23 is connected to the cooling section T22, and the other end of the surrounding section T23 is connected to the outlet T3. The surrounding section T23 may be formed on the motor-housing inner wall 22 and/or a casing part of the motor housing 20 (i.e., the motor-housing outer wall 23). In the present embodiment, the surrounding section T23 may be substantially a spiral structure. The surrounding section T23 may surround about the rotating axis AX1, and spirally extend towards the extending direction D1. In the present embodiment, the surrounding section T23 surrounds about the rotating axis AX1 along the motor-housing inner wall 22 in at least two turns, which means that the surrounding section T23 surrounds the exterior of the motor assembly 10 in at least two turns, too.

In the present embodiment, since the surrounding section T23 spirally extends along the motor-housing inner wall 22, and the cooling liquid L1 circulates through the surrounding section T23, the cooling liquid L1 may remove the heat which is generated and conducted from inside the motor assembly 10 to the motor-housing inner wall 22 and the motor-housing outer wall 23. Therefore, the heat generated by the motor assembly 10 is dissipated. In addition, thanks to the design of the motor housing 20 and the driver housing 40 in the present disclosure, the heat generated by the driver assembly 30 may be dissipated by using the cooling system and cooling mechanism in the motor housing 20, and no additional cooling device is required for the driver assembly 30. Therefore, the manufacturing cost of the integrated apparatus 1 of water-cooled motor and driver may be reduced. Furthermore, all the heat-dissipation flow channel T2 in the present disclosure may be bonded to the surface of the motor housing 20. The motor housing 20 is made of thermal-conductive material, and therefore better efficiency of heat-dissipation may be achieved. Moreover, the present embodiment is divided into pieces which are individual, and therefore has advantages such as easy to replace and convenient to repair.

Figure 5:
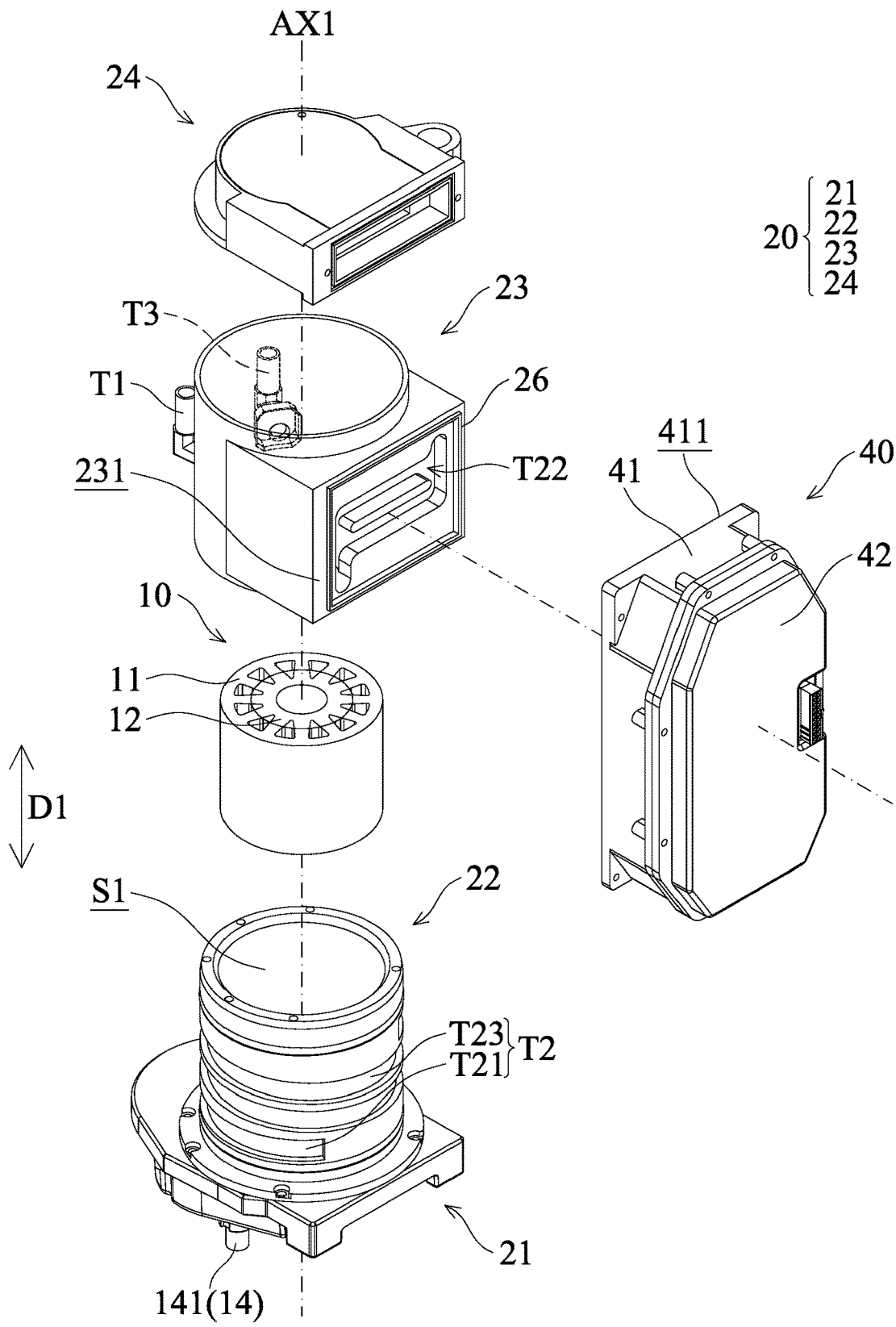
FIG. 5 is an exploded view illustrating a second embodiment of the integrated apparatus of water-cooled motor and driver in the present disclosure.
Figure 6:
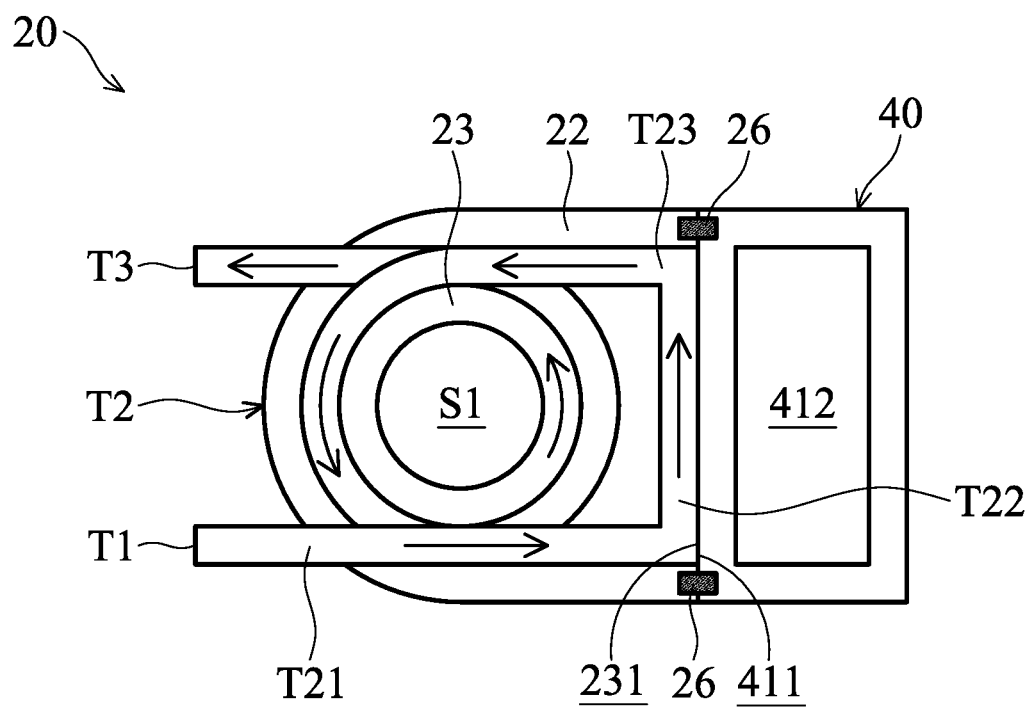
FIG. 6 is a schematic view illustrating the second embodiment of the motor housing and the driver housing in the present disclosure.

FIG. 5 is an exploded view illustrating a second embodiment of the integrated apparatus 1 of water-cooled motor and driver in the present disclosure. FIG. 6 is a schematic view illustrating the second embodiment of the motor housing 20 and the driver housing 40 in the present disclosure. The second embodiment includes a similar structure as the first embodiment, and the description of the portion that is substantially the same will be simplified. In the present embodiment, a portion of the cooling section T22 of the heat-dissipation flow channel T2 may overlap with the first connecting surface 231. In other words, the cooling section T22 may be partially formed on the first connecting surface 231. The second connecting surface 411 of the driver housing 40 may cover the exposed portion of the cooling section T22, and may be connected with and bonded to the exposed portion of the cooling section T22. Therefore, the efficiency of heat-dissipation and the power density may be further enhanced.

Accordingly, in the present embodiment, the exposed cooling section T22 (and the cooling liquid L1 circulates inside) may directly contact the driver housing 40, such that the heat generated and conducted from inside the driver assembly 30 to the driver housing 40 may be directly removed. Therefore, the heat-dissipation performance of the cooling liquid L1 to the driver assembly 30 may be further enhanced.

In some embodiments, a portion of the cooling section T22 overlaps with the second connecting surface 411. In other words, the cooling section T22 may deeply formed into the second connecting surface 411. Therefore, the contact area of the cooling section T22 (and the cooling liquid L1 circulates inside), which overlaps with the second connecting surface 411, and the driver housing 40 may be further increased, and thereby the heat-dissipation performance of the cooling liquid L1 to the driver assembly 30 may be further enhanced.

In the present embodiment, the motor housing 20 may further include a seal ring 26, and one side of the seal ring 26 is disposed on the first connecting surface 231 of the motor-housing outer wall 23. The other side of the seal ring 26 may be connected to the second connecting surface 411 of the driver housing 40. Thanks to the above design, the seal ring 26 may be configured to prevent the cooling liquid L1 in the cooling section T22 from flowing out of the gap between the first connecting surface 231 and the second connecting surface 411, thus to protect the motor assembly 10 or the driver assembly 30 from the condition of short circuit. The second embodiment is similar to the first embodiment, and the former two are assembled by split parts, and its advantages will not be repeated again.

Figure 7:
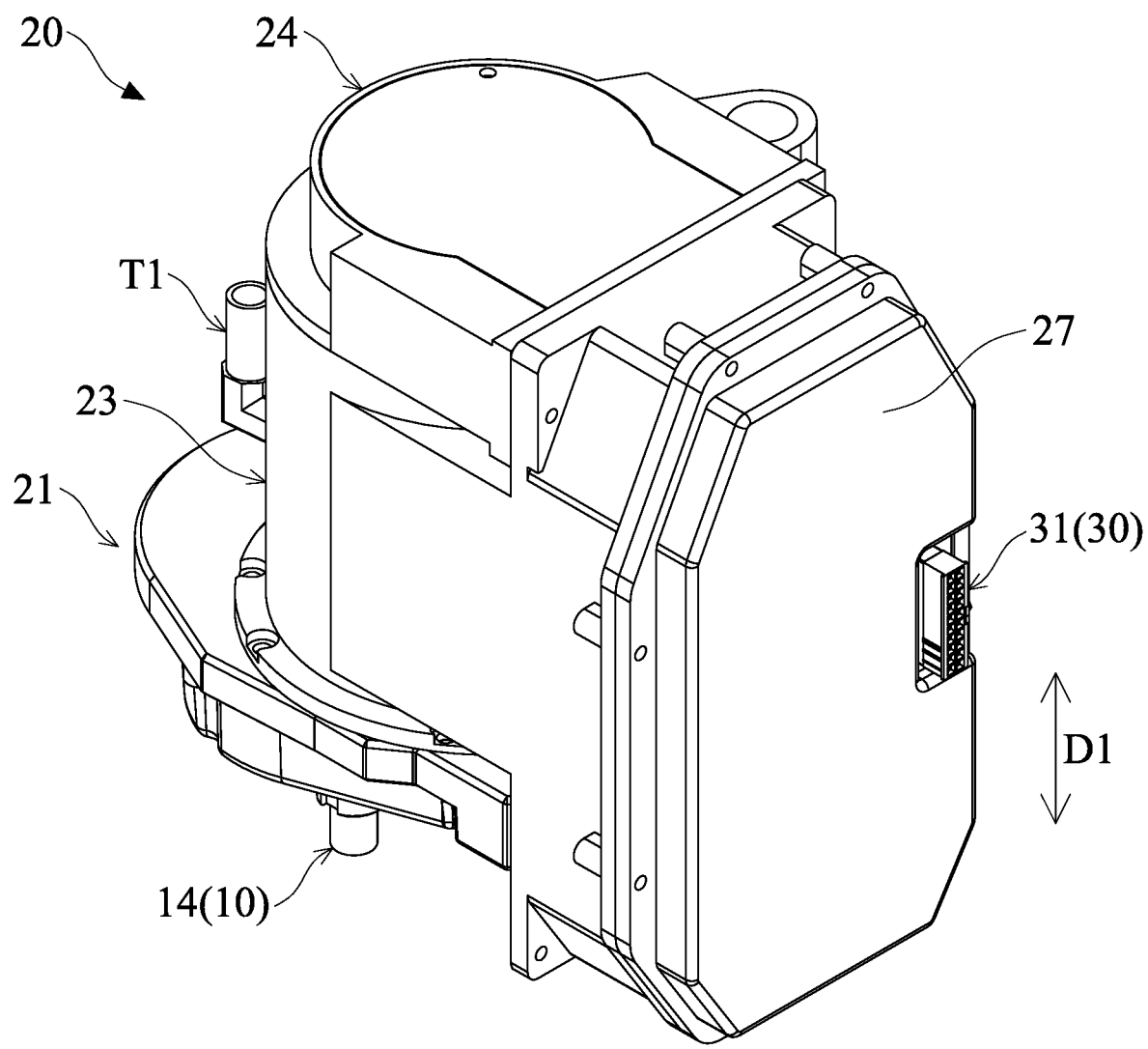
FIG. 7 is a perspective view illustrating a third embodiment of the integrated apparatus of water-cooled motor and driver in the present disclosure.
Figure 8:
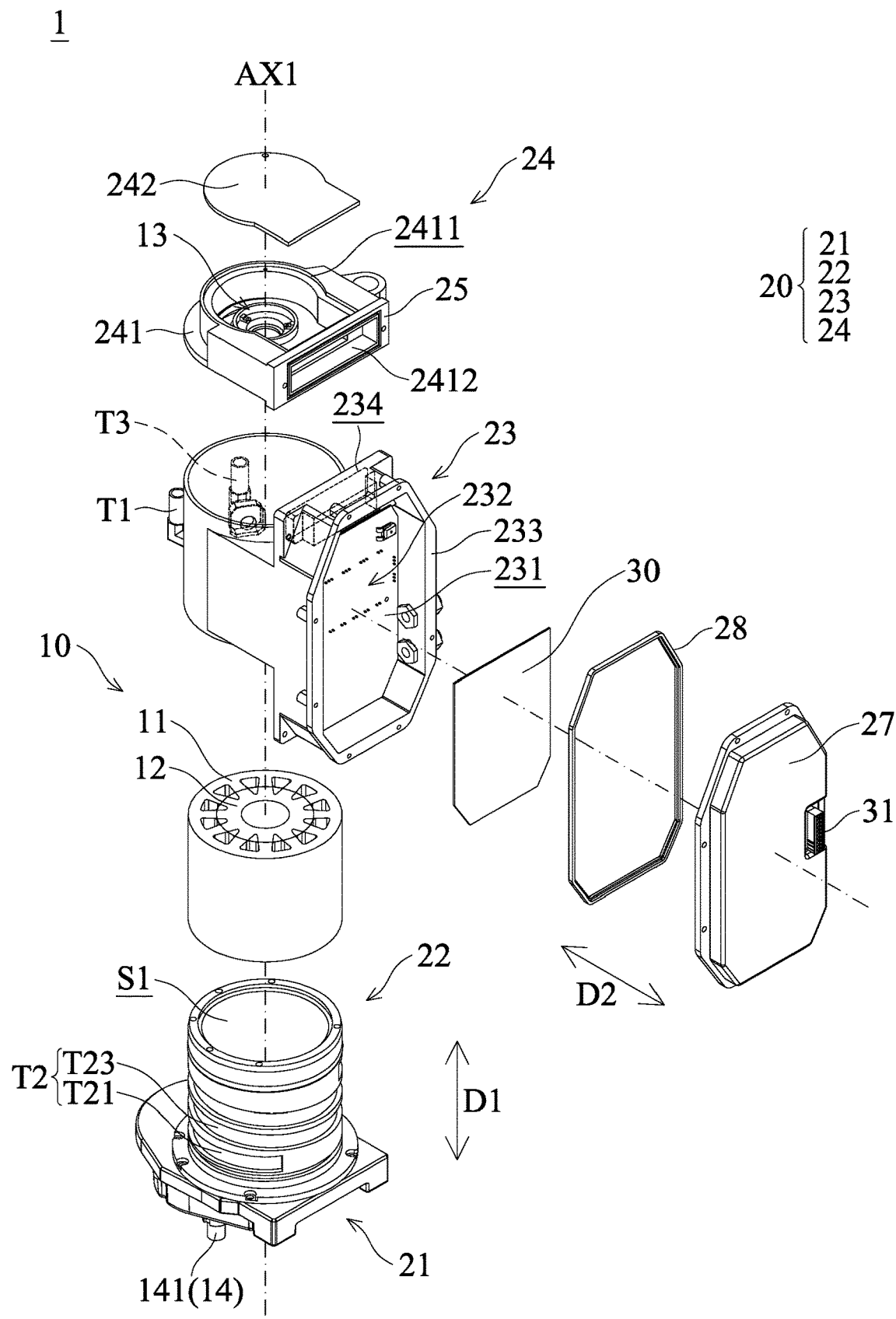
FIG. 8 is an exploded view illustrating the third embodiment of the integrated apparatus of water-cooled motor and driver in the present disclosure.
Figure 9:
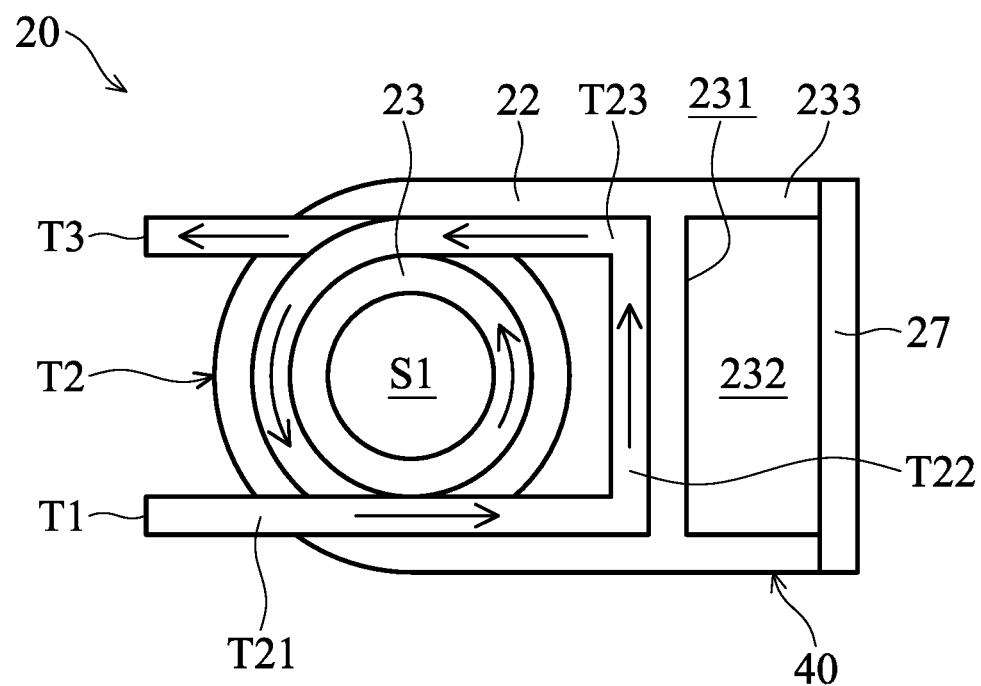
FIG. 9 is a schematic view illustrating the third embodiment of the motor housing and the driver housing in the present disclosure.

FIG. 7 is a perspective view illustrating a third embodiment of the integrated apparatus 1 of water-cooled motor and driver in the present disclosure. FIG. 8 is an exploded view illustrating the third embodiment of the integrated apparatus 1 of water-cooled motor and driver in the present disclosure. FIG. 9 is a schematic view illustrating the third embodiment of the motor housing 20 and the driver housing 40 in the present disclosure. The third embodiment includes a similar structure as the first embodiment, and the description of the portion that is substantially the same will be simplified. In the third embodiment, the integrated apparatus 1 of water-cooled motor and driver may not need to include the driver housing 40 as described. In the third embodiment, the motor-housing inner wall 22 surrounds and receives the motor assembly 10. The motor-housing outer wall 23 surrounds the motor-housing inner wall 22.

In the present embodiment, the exterior of the motor-housing outer wall 23 further includes a receiving groove 232 for receiving the driver assembly 30. The receiving groove 232 includes a first connecting surface (here also defined as a connecting surface) 231, an annular sidewall 233 and a cover plate 27, and the driver assembly 30 may be attached to one side, which is opposite to the motor assembly 10, of the first connecting surface (the connecting surface) 231. The annular sidewall 233 is connected to the first connecting surface (the connecting surface) 231. In the present embodiment, the annular sidewall 233 may be perpendicular to or substantially perpendicular to the first connecting surface (the connecting surface) 231. The annular sidewall 233 and the first connecting surface (the connecting surface) 231 collectively define and form the receiving groove 232 for receiving the driver assembly 30.

In the present embodiment, the motor-housing outer wall 23 may be connected to the top portion 24. The motor-housing outer wall 23 may have a third connecting opening (here defined as a connecting opening) 234. The third connecting opening (the connecting opening) 234 may pass through the receiving groove 232. The third connecting opening (the connecting opening) 234 may correspond to the first connecting opening 2412. In other words, the receiving groove 232 may communicate with the accommodating space 2411 via the third connecting opening (the connecting opening) 234 and the first connecting opening 2412.

The motor housing 20 may further include a cover plate 27 and a seal ring 28. The cover plate 27 is removably disposed on and connected to the annular sidewall 233. The cover plate 27, the first connecting surface (the connecting surface) 231 and the annular sidewall 233 collectively define and form the receiving groove 232, and thus surround the driver assembly 30. The seal ring 28 is disposed between the annular sidewall 233 and the cover plate 27. The seal ring 28 may be configured to prevent the cooling liquid L1 from flowing into the receiving groove 232 via between the annular sidewall 233 and the cover plate 27.

In the present embodiment, since the driver assembly 30 is directly disposed in the receiving groove 232 of the motor-housing outer wall 23 and attached to the first connecting surface (the connecting surface) 231, such that the heat generated by the driver assembly 30 may be directly transferred to the motor-housing outer wall 23, and may be then dissipated by the cooling liquid L1 circulated through the heat-dissipation flow channel T2 in the motor housing 20. Therefore, the heat-dissipation efficiency and power density of the driver assembly 30 may be further enhanced. In addition, in the present embodiment, since the motor housing 20 may be omitted, the assembly of the integrated apparatus 1 of water-cooled motor and driver may be simplified, and the cost may be reduced. One-piece design may strengthen the structure, and water-proof interface may be reduced. Furthermore, the present embodiment is a one-piece assembly structure, having the advantages such as commonly used mold, reducing material, and reducing assembly cost.

The above disclosed features may be combined, modified, substituted, or adapted with one or more disclosed embodiment in any suitable manner, and are not limited in specific embodiments. Some embodiments of the present disclosure provide advantages that may be better than the prior art. However, it should be understood that other embodiments may provide different advantages. It is not necessary to discuss all the advantages in the present disclosure, and no specific advantage is essential in all embodiments. Various advantages may be represented in some embodiments.

As set forth above, the present disclosure provides an integrated apparatus of water-cooled motor and driver, in which just one cooling system can be used for dissipating the heat of the motor assembly and the driver assembly at the same time. Therefore, the integrated apparatus of water-cooled motor and driver may reduce the manufacturing cost and the volume, and enhance the heat-dissipation efficiency and power density.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An integrated apparatus of water-cooled motor and driver, comprising:
    a motor housing, comprising:
    a motor-housing inner wall surrounding and receiving a motor assembly;
    a motor-housing outer wall surrounding the motor-housing inner wall, wherein an exterior of the motor-housing outer wall has a first connecting surface;
    an inlet disposed on the motor-housing outer wall;
    a heat-dissipation flow channel, wherein one end of the heat-dissipation flow channel is connected to the inlet, the end of the heat-dissipation flow channel contacts and is received between the motor-housing inner wall and the motor-housing outer wall; and
    an outlet connected to an other end of the heat-dissipation flow channel and disposed on the motor-housing outer wall;
    a driver housing receiving a driver assembly, wherein an exterior of the driver housing has a second connecting surface connected with and bonded to the first connecting surface of the motor-housing outer wall;
    a top portion disposed on and covering the motor-housing inner wall and the motor-housing outer wall, wherein the top portion has a first connecting opening facing the driver housing;
    a first seal ring disposed around the first connecting opening; and
    a second seal ring extending from the motor housing to the driver housing and penetrating the first connecting surface, wherein the first seal ring and the second seal ring extend parallel to each other,
    wherein the heat-dissipation flow channel further comprises a cooling section arranged corresponding to the first connecting surface.

2. The integrated apparatus of water-cooled motor and driver as claimed in claim 1, wherein both of the first connecting surface and the second connecting surface are planar, and the cooling section of the heat-dissipation flow channel is windingly arranged corresponding to the first connecting surface.

3. The integrated apparatus of water-cooled motor and driver as claimed in claim 1, wherein the second connecting surface is planar, the cooling section of the heat-dissipation flow channel is windingly arranged corresponding to the first connecting surface, and a portion of the cooling section of the heat-dissipation flow channel overlaps with the first connecting surface.

4. The integrated apparatus of water-cooled motor and driver as claimed in claim 1, further comprising a thermal-conductive material disposed between the first connecting surface and the second connecting surface.

5. The integrated apparatus of water-cooled motor and driver as claimed in claim 1, wherein the top portion surrounds and receives an electrical connector, and the electrical connector is electrically connected to the motor assembly and the driver assembly.

6. The integrated apparatus of water-cooled motor and driver as claimed in claim 1, wherein a cooling liquid circulates in the heat-dissipation flow channel.

7. An integrated apparatus of water-cooled motor and driver, comprising:
    a motor-housing inner wall surrounding and receiving a motor assembly;
    a motor-housing outer wall surrounding the motor-housing inner wall, wherein an exterior of the motor-housing outer wall has a receiving groove configured to receive a driver assembly;
    an inlet disposed on the motor-housing outer wall;
    a heat-dissipation flow channel, wherein one end of the heat-dissipation flow channel is connected to the inlet, the end of the heat-dissipation flow channel contacts and is received between the motor-housing inner wall and the motor-housing outer wall;
    an outlet connected to an other end of the heat-dissipation flow channel and disposed on the motor-housing outer wall;
    a top portion disposed on and covering the motor-housing inner wall and the motor-housing outer wall, wherein the top portion has an accommodating space communicating with the receiving groove via a first connecting opening; and
    a first seal ring disposed around the first connecting opening,
    wherein the receiving groove comprises:
        a connecting surface, wherein the driver assembly is attached to the connecting surface;
        an annular sidewall connected to the connecting surface; and
        a cover plate connected to the annular sidewall, wherein the connecting surface, the annular sidewall and the cover plate collectively surround the driver assembly, wherein a second seal ring is disposed between the annular sidewall and the cover plate, and the first seal ring and the second seal ring extend parallel to each other,
    wherein the heat-dissipation flow channel further comprises a cooling section arranged corresponding to the connecting surface.

8. The integrated apparatus of water-cooled motor and driver as claimed in claim 7, wherein the first seal ring is disposed between the annular sidewall and the cover plate.

9. The integrated apparatus of water-cooled motor and driver as claimed in claim 7, the top portion surrounds and receives an electrical connector, and the electrical connector is electrically connected to the motor assembly and the driver assembly.

10. The integrated apparatus of water-cooled motor and driver as claimed in claim 9, wherein the electrical connector is disposed in the accommodating space.

11. The integrated apparatus of water-cooled motor and driver as claimed in claim 7, wherein a cooling liquid circulates in the heat-dissipation flow channel.

* * * * *